United States Patent [19]
Pedersen

[11] Patent Number: 5,605,436
[45] Date of Patent: Feb. 25, 1997

[54] CENTRIFUGAL PUMP

[75] Inventor: Bent Pedersen, Århus C, Denmark

[73] Assignee: APV Fluid Handling Horsens A/S, Horsens, Denmark

[21] Appl. No.: 655,019

[22] Filed: May 29, 1996

[30] Foreign Application Priority Data

May 24, 1995 [DK] Denmark .................. 0596/95

[51] Int. Cl.⁶ .................................. F04D 29/08
[52] U.S. Cl. .................. 415/170.1; 415/174.2; 415/231; 277/59; 277/61; 277/62
[58] Field of Search .............. 415/170.1, 174.2, 415/174.3, 174.4, 229, 230, 231, 110, 111; 277/59, 65, 61, 62, 71

[56] References Cited

U.S. PATENT DOCUMENTS

| | | | |
|---|---|---|---|
| 2,427,656 | 9/1947 | Blom | 415/231 |
| 2,823,058 | 2/1958 | Ecker et al. | 415/174.2 |
| 2,853,020 | 9/1958 | Hollinger et al. | 277/65 |
| 3,285,614 | 11/1966 | McClenathan | 277/65 |
| 3,484,113 | 12/1969 | Moore | 277/62 |
| 3,741,679 | 6/1973 | Johnston | 415/231 |
| 3,762,724 | 10/1973 | Porter | 277/65 |
| 3,914,072 | 10/1975 | Rowley et al. | 415/174.2 |

FOREIGN PATENT DOCUMENTS

| | | |
|---|---|---|
| 2228296B2 | 11/1979 | Germany. |
| 3544872C2 | 2/1990 | Germany. |

*Primary Examiner*—John T. Kwon
*Attorney, Agent, or Firm*—Lowe, Price, LeBlanc & Becker

[57] ABSTRACT

A centrifugal pump provided with an impeller, a pump shaft, a pump housing and with a motor coupled to the pump shaft. A shaft seal device is arranged between the pump shaft and the rear wall of the pump housing respectively, and a cooling unit mounted on the outer surface of the latter at the location where the shaft extends through a hole in the rear wall. The shaft seal device is provided with a first set of sealing element arranged between the rear wall and the pump shaft as well as with a second set of sealing element arranged so as to prevent coolant from leaking between the shaft and the cooling unit. A thrust collar is interconnected with a flush pipe extending inside the collar but around the pump shaft and further arranged under the two sets of sealing element. Coolant can flow on the inner surface as well as on the outer surface of the flush pipe. A particularly efficient seal is provided at the location in the rear wall where the extends therethrough.

8 Claims, 1 Drawing Sheet

CENTRIFUGAL PUMP

BACKGROUND FOR THE INVENTION

1. Field of the Invention

The invention relates to a centrifugal pump provided with an impeller, a pump shaft, a pump housing as well as with a motor coupled to the pump housing and the pump shaft, and where a shaft seal device circumscribes the pump shaft and is provided with a first set of sealing means arranged between the rear wall and the pump shaft and with a second set of sealing means arranged so as to prevent coolant such as cooling water from leaking between the shaft and a cooling unit mounted on the outer surface of the rear wall, and where a preloaded spring means such as a coil spring is arranged between the two sets of sealing means.

2. Background Art

For a long time, it has been desired to enhance the efficiency of the shaft seal devices arranged on centrifugal pumps at the location where the pump shaft extends through the rear wall of the pump housing so as to reduce an undesirable leakage of the pump fluid.

SUMMARY OF THE INVENTION

The object of the invention is to provide a centrifugal pump of the above type which provides a particularly efficient sealing at the location where the shaft extend through the rear wall.

In satisfaction of the above object there is provided by the present invention a centrifugal pump, wherein the spring means partly abuts a thrust plate which in turn abuts the first set of sealing means, and partly abuts a thrust collar which in turn abuts the second set of sealing means, and that the thrust collar is interconnected with a flush pipe extending inside said collar, but around the pump shaft and further arranged under the sealing means, said flush pipe allowing coolant to pass on its inner surface and its outer surface. Thus, a highly efficient forced flushing of the sealing means by means of the coolant is obtained, whereby the seal becomes more efficient, as the sealing means are less inclined to run hot. Moreover, the seal is also more efficient, as the coolant may act as a barrier fluid in relation to the pump fluid in the pump housing. As the spring means is preloaded, the two sets of sealing means are kept "dynamic", i.e. such that they can perform small axial movements during operation of the motor and thus of the centrifugal pump. These small movements are particularly advantageous, if the pump is to operate as an hygienic pump. The sealing means are largely self-cleaning, thus increasing their efficiency.

According to the invention, the first set of sealing means may comprise a stator ring attached to the rear wall, preferably in an indirect manner, and a first rotor ring which is fixedly connected with the rear face of the impeller may sealingly abut said stator ring, and where a first annular chamber may be arranged between the rear wall and the stator ring and housing a first sealing, resilient ring such as an O-ring. A particularly efficient seal is thus obtained at the location where the pump shaft extends through the rear wall.

According to the invention, the second set of sealing means may comprise a second stator ring arranged inside the cooling unit and around the shaft, a second rotor ring which is fixedly connected to the shaft may sealingly abut said second stator ring, and where a second annular chamber may be arranged between the cooling unit and the second stator ring and housing a second sealing, resilient ring such as an O-ring. It is thus highly efficiently obtained that a coolant acting as a barrier fluid does not leak undesirably.

Moreover, according to the invention, the annular chambers housing the O-rings each has an axial length exceeding the diameter d of the cross-section of the associated O-ring and preferably of a length of 1.1–1.5, e.g. 1.2–1.3 times d. As a result, the self-cleaning ability of the two sets of sealing means during operation is enhanced.

Furthermore, according to the invention, the thrust collar may be provided with at least one axially extending projection co-acting with the end face of the second stator ring and defining one or several essentially radial passageways to enhance the circulation of coolant in the compartment defined by the stator ring, the rotor rings, the rear wall of the pump housing, the shaft and the impeller. In this manner, improved conditions for a radial flowing of coolant within said compartment are obtained.

According to the invention, both the thrust plate and the thrust collar may be provided with an axial projection engaging the first and second stator ring respectively, as well as provided with radial projections engaging the cooling unit so as to prevent a rotation of the stator rings. In practice, this has proved particularly efficient, as the stator rings are prevented from rotating, but nevertheless may perform small axial movements (vibrations).

Moreover, according to the invention, the cooling unit may be provided with a passageway for the feeding of coolant and which is arranged essentially halfway between the thrust plate and the thrust collar, and with a passageway for drainage of coolant and which is arranged so as to communicate with the second annular chamber. In this manner, a particularly effective circulation of the coolant is obtained.

Finally, according to the invention, sealing O-rings may be provided between the rotor ring and the hub part of the impeller as well as between the rotor ring and a shaft connection member arranged at the motor housing. The coolant acting as a barrier fluid may be particularly efficient.

BRIEF DESCRIPTION OF THE DRAWING

The invention is explained in detail below with reference to the drawing, in which.

DETAILED DESCRIPTION OF PREFERRED EMBODIMENTS

Figure 1:
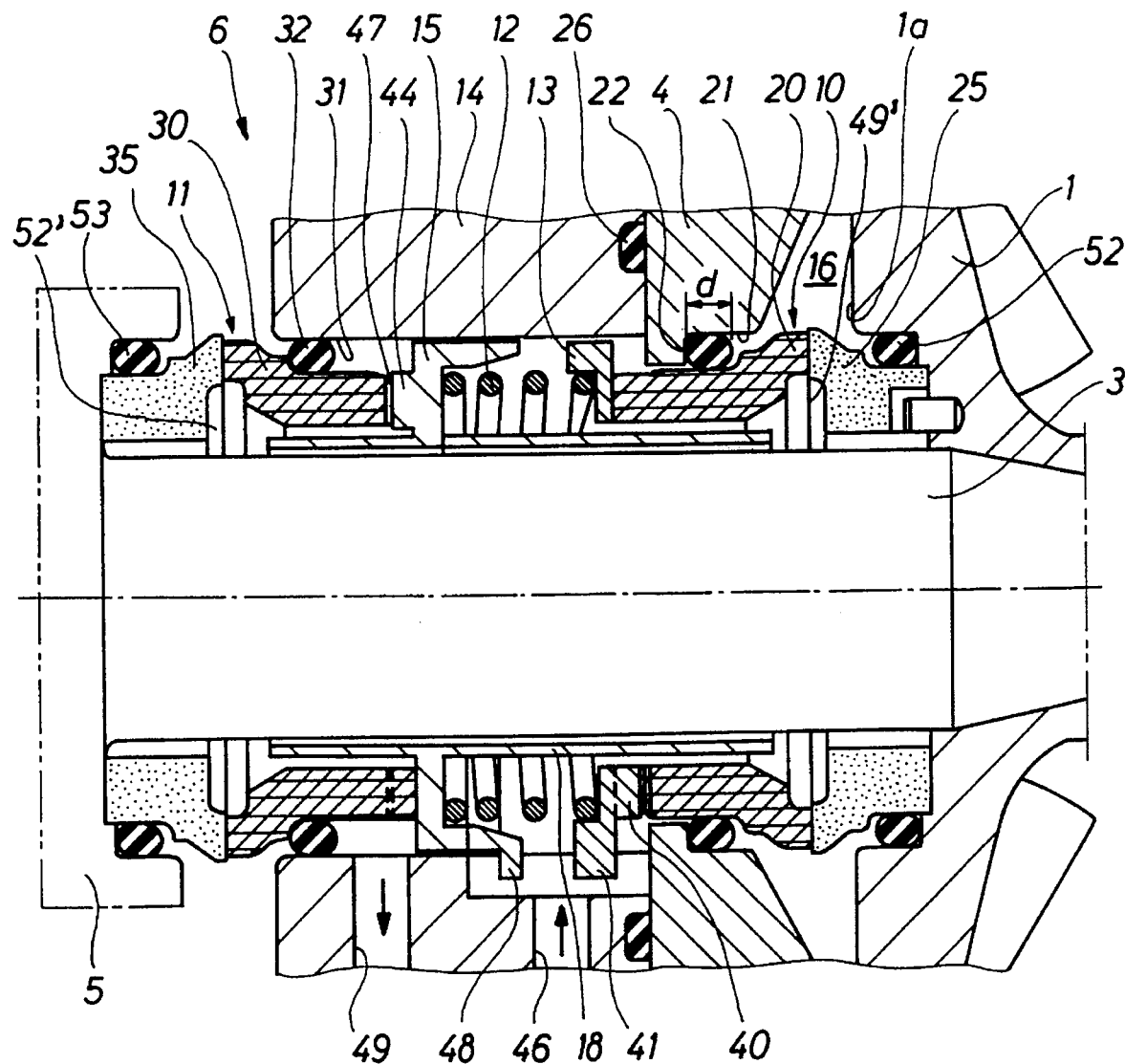
FIG. 1 illustrates a longitudinal cross-section of an embodiment of a centrifugal pump according to the invention, large parts of the pump housing, the impeller and the pump shaft being removed.

The centrifugal pump shown in FIG. 1 is provided with an impeller 1 mounted on a pump shaft 3 and rotatable within a pump housing, only the rear wall 4 thereof being shown in FIG. 1. Thus, the front wall of the pump housing is arranged to the right of the impeller, but has been removed in order not to obscure the essential feature of the present invention. A motor 5 is coupled to the pump housing and the pump shaft 3, said motor being indicated farthest to the left in the FIGURE. A shaft seal device 6 is arranged between the pump shaft 3 and the rear wall 4 of the pump housing on the location where the shaft extends through a hole in the rear wall. The shaft seal device is provided with a first set of sealing means 10 arranged between the rear wall 4 and the pump shaft 3 as well as with a second set of sealing means 11 arranged so as to prevent coolant from leaking between the shaft and a cooling unit 14 fixedly mounted on the rear face of the rear wall 4 and containing circulating coolant such as cooling water. The cooling unit is secured to the rear wall in a suitable manner, for instance by being screwed thereto, and a sealing, resilient ring such as an O-ring 26 is provided between the unit and said rear wall. The water circulating in the cooling unit 14 not only serves as a coolant, but also as a barrier fluid, i.e. it may be pressurised at least corresponding to the pressure in the compartment between the rear face of the impeller 1 and the rear wall 4 of the pump housing.

As shown, the first set of sealing means 10 may comprise a first stator ring 20 attached to the rear wall 4, preferably in an indirect manner, where a first rotor ring 25, which is fixedly connected with the rear face 1a of the impeller, may sealingly abut said stator ring. A first annular chamber 21 may be arranged between the rear wall 4 and the stator ring 20 and housing a first sealing, resilient ring such as an O-ring 22.

The second set of sealing means 11 may comprise a second stator ring 30 arranged inside the cooling unit 14 and around the shaft 3, and a second rotor ring 35 which is fixedly connected to the shaft may sealingly abut said second stator ring. A second annular chamber 31 may be arranged between the cooling unit 14 and the second stator ring and housing a second sealing, resilient ring such as an O-ring 32.

A preloaded spring means such as a coil spring 12 is arranged between the two sets of sealing means 10, 11, said spring abutting a thrust plate 13 which in turn abuts the first set of sealing means 10 and abutting a thrust collar 15 which in turn abuts the second set of sealing means 11.

As illustrated, the thrust collar 15 is interconnected with a flush pipe 18 extending inside said collar, but around the pump shaft and further arranged under the two sealing means 10, 11. The flush pipe extends particularly under the stator rings 20 and 30. The flush pipe 18 is arranged so as to allow the coolant to pass on both its inner surface and its outer surface.

The annular chambers 21 and 31 housing the O-rings 22 and 32 may have an axial length exceeding the diameter d of the cross-section of the associated O-ring. Preferably, the each chamber has a length of 1.1–1.5, e.g. 1.2–1.3 times d.

As shown, the thrust plate 13 may be provided with at least one axial projection 40 engaging the first stator ring 20 and with one or several radially extending projections 41 engaging the cooling unit 14 so as to prevent a rotation of the stator ring 20 relative to the rear wall. In a corresponding manner, the thrust collar may be provided with at least one axially extending projection 44 co-acting with the second stator ring 30 and as the thrust collar 15 be provided with at least one radially extending projection 48 engaging the cooling unit 14 so as to prevent the stator ring from rotating relative to the cooling unit and thus relative to the rear wall 4. At the same time, the projection 45 ensures that the coil spring 12 is preloaded permanently.

Jointly with one end face of the second stator ring 30 the axially extending projection 44 of the thrust collar 15 may define one or several essentially radial passageways 47 to enhance the circulation of coolant in the compartment defined by the stator rings 20, 30, the rotor rings 25,35, the rear wall 4 of the pump housing, the cooling unit 44, the shaft 3 and the impeller 1.

Coolant may be fed to said compartment through an inlet passageway 46 formed in the cooling unit 14 and ending essentially halfway between the thrust plate 13 and the thrust collar 15. The coolant may be drained off from said compartment through an drainage passageway 49 in the cooling unit. As shown, the drainage passageway 49 may be arranged opposite the second annular chamber 31. Since the coolant passes through the passageway 46, it flows to the outer surface of the flush pipe and then enters one of the compartments 49' defined by the stator ring 20 and the rotor ring 25 and subsequently flows to the left through passageways between the pump shaft 3 and the flush pipe 18. When the coolant reaches the compartment 52' defined by the stator ring 30 and the rotor ring 35, it flows to the right, flowing under the stator ring 30, and subsequently passing radially outwardly through the drainage passageway 49. The passageways 46 and 49 may be connected with a pump (not shown) providing a difference in pressure therebetween.

As shown, an O-ring 52 may be provided between the rotor ring 25 and the hub part of the impeller 1. In a similar manner a sealing O-ring 53 may provided between the shaft connection member 5 mounted on the motor housing and the second rotor ring 35.

The invention may be modified in many ways without thereby deviating from the scope of the invention.

I claim:

1. A centrifugal pump provided with an impeller, a pump shaft and a pump housing as well as with a motor coupled to the pump shaft, and where a shaft seal device circumscribes the pump shaft and is provided with a first set of the sealing means arranged between the rear wall and the pump shaft and with a second set of sealing means arranged so as to prevent coolant such as cooling water from leaking between the shaft and a cooling unit mounted on the outer surface of the rear wall, and where a preloaded spring means such as a coil spring is provided between the two sets of sealing means, wherein the spring means partly abuts a thrust plate which in turn abuts the first set of sealing means and partly abuts a thrust collar which in turn abuts the second set of sealing means and that the thrust collar is interconnected with a flush pipe extending inside said collar, but around the pump shaft and further arranged under the two sets of sealing means, the flush pipe further allowing coolant to pass on its inner surface as well as on its outer surface.

2. A centrifugal pump as claimed in claim 1, wherein the first set of sealing means comprises a first stator ring attached to the rear wall, and a first rotor ring which is fixedly connected with the rear face of the impeller may sealingly abut said stator ring, and that a first annular chamber is arranged between the rear wall and the first stator ring and housing a first sealing, resilient ring such as an O-ring.

3. A centrifugal pump as claimed in claim 1, wherein the second set of sealing means comprises a second stator ring arranged inside the cooling unit and around the shaft, a second rotor ring which is fixedly connected to the shaft may sealingly abut said second stator ring, and that a second annular chamber is arranged between the cooling unit and the second stator ring and housing a second sealing, resilient ring such as an O-ring.

4. A centrifugal pump as claimed in claim 1, wherein the annular chambers that house the O-rings, each have an axial length exceeding the diameter d of the cross-section of the associated O-ring, by 1.2–1.3 times d.

5. A centrifugal pump as claimed in claim 1, wherein the thrust collar is provided with at least one axially extending projection co-acting with the end face of the second stator ring and defining one or several essentially radial passageways to enhance the circulation of coolant in the compartment defined by the stator rings, the rotor rings, the rear wall of the pump housing, the shaft and the impeller.

6. A centrifugal pump as claimed in claim 1, wherein both the thrust plate and the thrust collar is provided with at least one axial projections engaging the first and the second stator ring respectively, as well as with at least one radial projections engaging the cooling unit so as to prevent a rotation of the stator rings.

7. A centrifugal pump as claimed in claim 6, wherein the cooling unit is provided with a passageway for the feeding of coolant and which is arranged essentially halfway between the thrust plate and the thrust collar as well as with a passageway to drain off coolant and which is arranged so as to communicate with the second annular chamber.

8. A centrifugal pump as claimed in claim 1, wherein sealing O-rings are provided between the rotor rings and the hub part of the impeller as well as between the rotor rings and a shaft connection member arranged at the motor housing.

* * * * *